United States Patent
Nagatomi et al.

(10) Patent No.: US 12,451,722 B2
(45) Date of Patent: Oct. 21, 2025

(54) BACKUP POWER SUPPLY SYSTEM, MOBILE OBJECT, BACKUP POWER SUPPLY SYSTEM CONTROLLING METHOD, AND PROGRAM

(71) Applicant: Panasonic Intellectual Property Management Co., Ltd., Osaka (JP)

(72) Inventors: Yuta Nagatomi, Osaka (JP); Masafumi Nakamura, Mie (JP); Masatoshi Nakase, Mie (JP); Hiroki Akashi, Osaka (JP); Kinya Kato, Shiga (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 18/569,626

(22) PCT Filed: Aug. 17, 2022

(86) PCT No.: PCT/JP2022/031068
§ 371 (c)(1),
(2) Date: Dec. 13, 2023

(87) PCT Pub. No.: WO2023/026922
PCT Pub. Date: Mar. 2, 2023

(65) Prior Publication Data
US 2024/0275202 A1    Aug. 15, 2024

(30) Foreign Application Priority Data
Aug. 27, 2021  (JP) .................. 2021-139309

(51) Int. Cl.
*H02J 9/06*     (2006.01)
*H02J 7/00*     (2006.01)
*H02J 7/34*     (2006.01)

(52) U.S. Cl.
CPC .......... *H02J 9/061* (2013.01); *H02J 7/00714* (2020.01); *H02J 7/34* (2013.01); *H02J 2207/20* (2020.01)

(58) Field of Classification Search
CPC .......... H02J 9/061; H02J 7/00714; H02J 7/34; H02J 2207/20
(Continued)

(56) References Cited

U.S. PATENT DOCUMENTS 11,652,360 B2 *   5/2023  Shindo .................... H02J 9/061
                                                            307/10.1
2020/0106082 A1 * 4/2020  Fukushima ............. B60L 50/60
(Continued)

FOREIGN PATENT DOCUMENTS

| JP | 2008-054363 | 3/2008 |
| JP | 2009-219176 | 9/2009 |
| WO | 2020/116260 | 6/2020 |

OTHER PUBLICATIONS

International Search Report of PCT application No. PCT/JP2022/031068 dated Oct. 4, 2022.

*Primary Examiner* — Michael R. Fin
(74) *Attorney, Agent, or Firm* — Greenblum & Bernstein, P.L.C.

(57) ABSTRACT

A backup power supply system (1) includes a first terminal (T1), a second terminal (T2), a disconnect device (10), a current detector (20), a charge/discharge device (30), an auxiliary power supply (40), and a controller (50). The disconnect device (10) is connected between the first terminal (T1) configured to be connected to a main power supply (2) and the second terminal (T2) configured to be connected to a load (3). The charge/discharge device (30) is connected between the auxiliary power supply (40) and a node (P1) between the disconnect device (10) and the second terminal (T2). The charge/discharge device (30) is configured to
(Continued)

receive power supplied from main power supply (2) to cause a charging current to flow to the auxiliary power supply (40) in a non-defective state in which the main power supply (2) is not defective. The charge/discharge device (30) is configured to receive power supplied from the auxiliary power supply (40) to cause a discharging current to flow to the load (3) in a defective state. The controller (50) is configured to have the disconnect device (10) be in a connecting state while the current detector (20) does not detect the discharging current, and to have the disconnect device (10) be in a disconnecting state while the current detector (20) detects the discharging current.

14 Claims, 5 Drawing Sheets

(58) Field of Classification Search
USPC .................................................. 307/64, 10.1
See application file for complete search history.

(56) References Cited

U.S. PATENT DOCUMENTS

| | | | |
|---|---|---|---|
| 2020/0313457 A1* | 10/2020 | Kozuki | H02J 7/0047 |
| 2022/0021233 A1 | 1/2022 | Kambara | |
| 2022/0158480 A1* | 5/2022 | Sasahara | H02J 7/007182 |

* cited by examiner

BACKUP POWER SUPPLY SYSTEM, MOBILE OBJECT, BACKUP POWER SUPPLY SYSTEM CONTROLLING METHOD, AND PROGRAM

CROSS-REFERENCE TO RELATED APPLICATIONS

This application is a U.S. national stage application of the PCT International Application No. PCT/JP2022/031068 filed on Aug. 17, 2022, which claims the benefit of foreign priority of Japanese patent application No. 2021-139309 filed on Aug. 27, 2021, the contents all of which are incorporated herein by reference.

TECHNICAL FIELD

The present disclosure relates to a backup power supply system, a movable apparatus, a method for controlling the backup power supply system, and a program. More specifically, the present disclosure relates to a backup power supply system, a movable apparatus, a method for controlling the backup power supply system, and a program by which power can be supplied to a load when a main power supply is defective.

BACKGROUND ART

PTL 1 discloses an in-vehicle backup power supply device. The backup power supply device includes a power storage unit and a backup power supply control device. When the supply of power from the power supply unit is in a normal state, the backup power supply control device sets each of an input disconnect device and an output disconnect device to an allowable state, and supplies power from a power supply unit to a load via a first conductive path, a second conductive path, and a third conductive path. In the normal state, a charge/discharge device charges the power storage unit. When the supply of power from the power supply unit is defective, the backup power supply control device sets the input disconnect device to a disconnecting state and sets the output disconnect device to an allowable state, and the charge/discharge device discharges power from the power storage unit and supplies power to the load via the output disconnect device.

CITATION LIST

Patent Literature

PTL 1: International Publication No. 2020/116260

SUMMARY OF INVENTION

Problem to Be Solved

In the backup power supply device in PTL 1, the backup power supply control device determines whether the power supply unit is in a normal state or in a defective state based on a voltage of the first conductive path between the power supply unit and the input disconnect device. In the case where the charge/discharge device is implemented by a bidirectional DC-DC converter or the like which does not require control from outside and the power supply unit (main power supply) is defective, the charge/discharge device shifts to a discharging operation without control from the outside in response to a slight decrease in a voltage of the second conductive path. Accordingly, power is supplied from the charge/discharge device through the input disconnect device and the output disconnect device maintained in the allowable state, and thus a voltage of the first conductive path is maintained. Therefore, the backup power supply control device cannot detect the occurrence of the defective state, and the input disconnect device is not controlled to a disconnecting state, and therefore, the power supplied from the power storage unit (auxiliary power supply) flows to a power supply unit side, and the power that can be supplied to the load may be reduced.

Solution to Problem

An object of the present disclosure is to provide a backup power supply system, a movable apparatus, a method for controlling the backup power supply system, and a program by which a decrease in power supplied to a load can be prevented.

A backup power supply system according to an aspect of the present disclosure includes a first terminal, a second terminal, a disconnect device, an auxiliary power supply, a charge/discharge device, and a controller. The first terminal is configured to be connected to a main power supply. The second terminal is configured to be connected to a load. The disconnect device is connected between the first terminal and the second terminal and is switchable between a connecting state and a disconnecting state. The auxiliary power supply is configured to supply power to the load in a defective state in which the main power supply is defective. The charge/discharge device is connected between the auxiliary power supply and a node between the disconnect device and the second terminal. The charge/discharge device is configured to: receive power supplied from the main power supply to cause a charging current to flow to the auxiliary power supply in a non-defective state in which the main power supply is not defective; and receive power supplied from the auxiliary power supply to cause a discharging current to flow to the load in the defective state. The current detector is configured to detect at least the discharging current flowing from the charge/discharge device. The controller is configured to: control the disconnect device to have the disconnect device be in the connecting state while the current detector does not detect the discharging current; and control the disconnect device to have the disconnect device be in the disconnecting state while the current detector detects the discharging current.

A movable apparatus according to an aspect of the present disclosure includes the backup power supply system and a movable body. The backup power supply system, the main power supply, and the load are mounted on the movable apparatus.

A method for controlling a backup power supply system according to an aspect of the present disclosure is a method for controlling the backup power supply system, and includes a detection step and a control step. In the detection step, the discharging current flowing out of the charge P1025752US03/discharge device is detected. In the control step, the disconnect device is controlled to be in the connecting state while the discharging current is not detected in the detection step, and the disconnect device is controlled to be in a disconnecting state while the discharging current is detected in the detection step.

A program according to an aspect of the present disclosure is a program for allowing a computer system to execute the method for controlling a backup power supply system.

Advantageous Effect of Invention

According to the present disclosure, a decrease in power supplied to a load is prevented.

DESCRIPTION OF EMBODIMENTS

Exemplary Embodiment (1) Overview

A backup power supply system according to an exemplary embodiment of will be described below. Each drawing described in the following embodiments is a schematic drawing, and a ratio of a size to a thickness of each component in each drawing does not necessarily reflect an actual dimension ratio.

Figure 1:
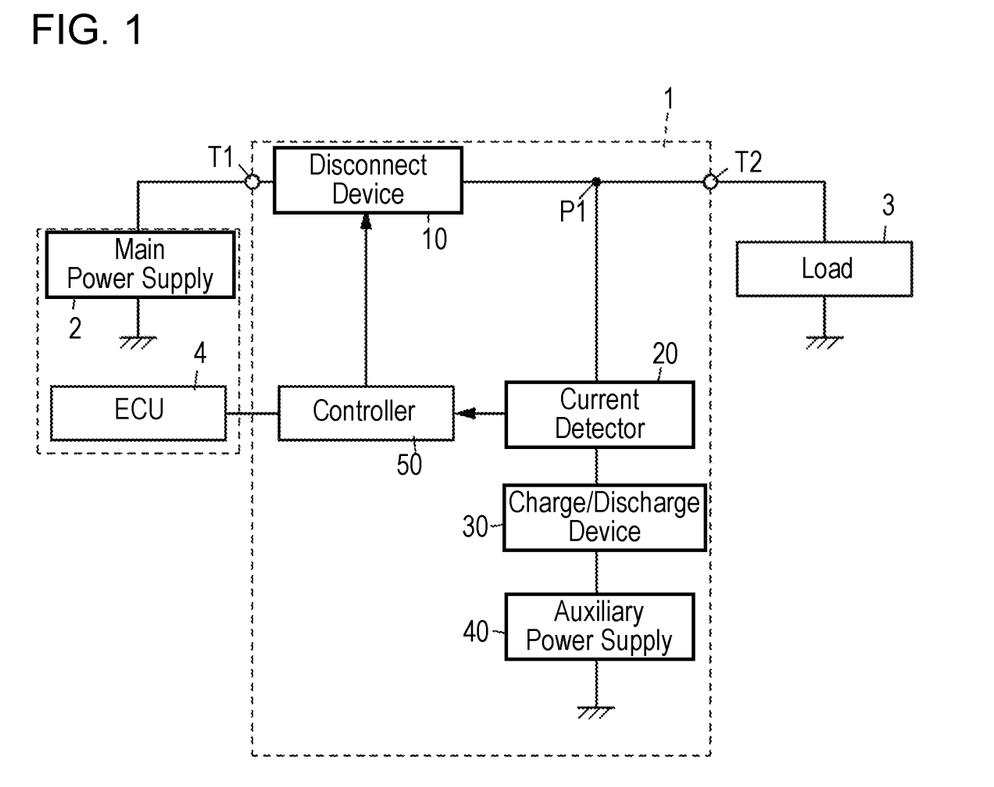
FIG. 1 is a schematic block diagram of a backup power supply system according to an exemplary embodiment of the present disclosure.

As shown in FIG. 1, backup power supply system 1 according to the embodiment includes first terminal T1, second terminal T2, disconnect device 10, current detector 20, charge/discharge device 30, auxiliary power supply 40, and controller 50.

Main power supply 2 is configured to be connected to first terminal T1.

Load 3 is configured to be connected to second terminal T2.

Disconnect device 10 is connected between first terminal T1 and second terminal T2.

Auxiliary power supply 40 is a power supply for supplying power to load 3 in a defective state in which main power supply 2 is defective.

Charge/discharge device 30 is connected between auxiliary power supply 40 and node P1 between disconnect device 10 and second terminal T2. Charge/discharge device 30 is configured to receive power supplied from main power supply 2 to cause a charging current to flow to auxiliary power supply 40 in a non-defective state in which main power supply 2 is not defective. Charge/discharge device 30 is configures to receive power supplied from auxiliary power supply 40 to cause a discharging current to flow to the load 3 in the defective state.

Current detector 20 is configured to detect at least the discharging current flowing form charge/discharge device 30.

Controller 50 is configured to control disconnect device 10 to have disconnect device 10 be in a connecting state while current detector 20 does not detect the discharging current, and to control disconnect device 10 to have disconnect device 10 be in a disconnecting state while current detector 20 detects the discharging current.

First terminal T1 and second terminal T2 may be components (terminals) to be connected to electric wires or the like, or may be, for example, leads of an electronic component or a part of a conductor formed as a wiring on a circuit board. Node P1 is a part of an electric path connecting disconnect device 10 to second terminal T2, and is a portion to which charge/discharge device 30 is connected. Node P1 may be a part of a conductor implemented by a wiring on a circuit board, a part of a lead wire connecting disconnect device 10 to second terminal T2, or a component (terminal) for connecting an electric wire or the like.

The defective state of main power supply 2 refers to a state in which a voltage input from main power supply 2 to first terminal T1 is decreased below a predetermined threshold due to a defect in main power supply 2, a ground fault in main power supply 2 or a circuit connecting main power supply 2 and first terminal T1. The non-defective state of main power supply 2 refers to a state in which the voltage input from main power supply 2 to first terminal T1 is equal to or higher than the threshold. The predetermined threshold is preferably determined to be, for example, a voltage lower than a rated voltage of main power supply 2 and higher than a minimum guaranteed voltage required for load 3 to operate normally.

In the non-defective state of main power supply 2, controller 50 controls disconnect device 10 to have disconnect device 10 be in the connecting state, and therefore, load 3 receives power supplied from main power supply 2 via disconnect device 10 to operate. In the non-defective state of main power supply 2, charge/discharge device 30 receives power supplied from main power supply 2 and cause a charging current to flow to auxiliary power supply 40 to charge auxiliary power supply 40.

On the other hand, in the defective state of main power supply 2, charge/discharge device 30 receives power supplied from auxiliary power supply 40 and causes a discharging current to flow to load 3 to operate load 3. When charge/discharge device 30 receives power supplied from auxiliary power supply 40 and causes a discharging current to flow, the discharging current is detected by current detector 20, and controller 50 switches disconnect device 10 to the disconnecting state. Therefore, the discharging current from auxiliary power supply 40 is prevented from flowing to a circuit on a main power supply 2 side via first terminal T1. This operation thus provides an advantageous effect preventing a decrease in the power supplied to load 3.

Figure 2:
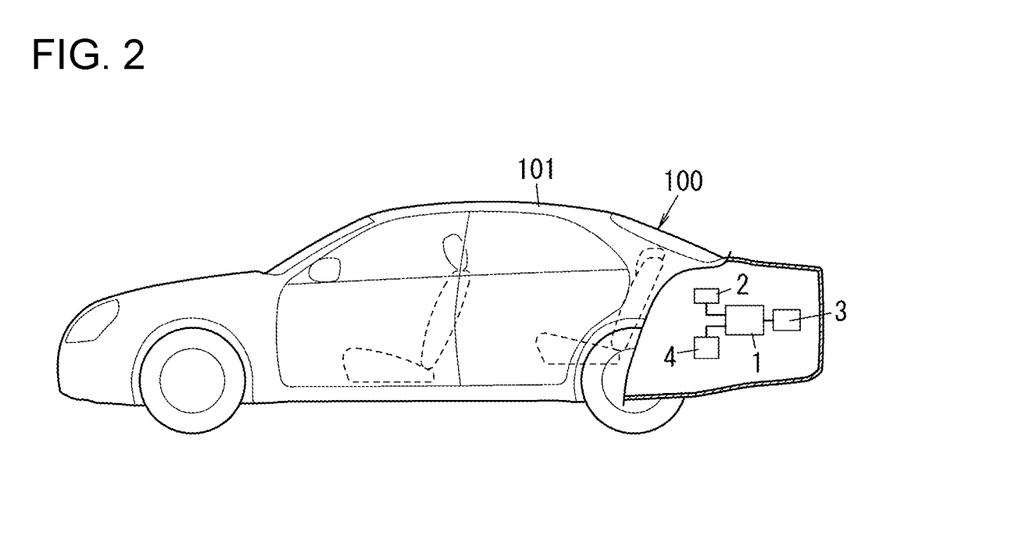
FIG. 2 is a partially cutaway side view of a vehicle on which the backup power supply system according to the embodiment of the present disclosure is mounted.

Backup power supply system 1 according to the present embodiment is configured to be mounted on a movable apparatus, such as vehicle 100 (see FIG. 2). That is, the movable apparatus (vehicle 100) includes backup power supply system 1 and movable body 101 (for example, a body of vehicle 100). Backup power supply system 1, main power supply 2, and load 3 are mounted on movable body 101. Backup power supply system 1 supplies power from auxiliary power supply 40 to load 3 (for example, an electric brake system) in a defective state in which main power supply 2 of vehicle 100 (for example, a battery of vehicle 100) is defective. Accordingly, load 3 continuously operates with power supplied from auxiliary power supply 40 even in the defective state of main power supply 2. FIG. 2 schematically illustrates backup power supply system 1 mounted on vehicle 100. A mounting position of backup power supply system 1 is not limited. Backup power supply system 1 is generally mounted at a position from an engine room to a console box on a front side of vehicle 100. The mounting position of backup power supply system 1 may be appropriately changed.

In accordance with the present embodiment, backup power supply system 1 is mounted on vehicle 100. The movable apparatus is not limited to vehicle 100 and may be an airplane, a ship, a train, or the like. Backup power supply system 1 is not limited to being mounted on the movable apparatus, and may be disposed and used in a facility or the like.

(2) Details

Backup power supply system 1 according to the embodiment will be detailed below with reference to FIGS. 1 and 3.

(2.1) Configuration

Figure 3:
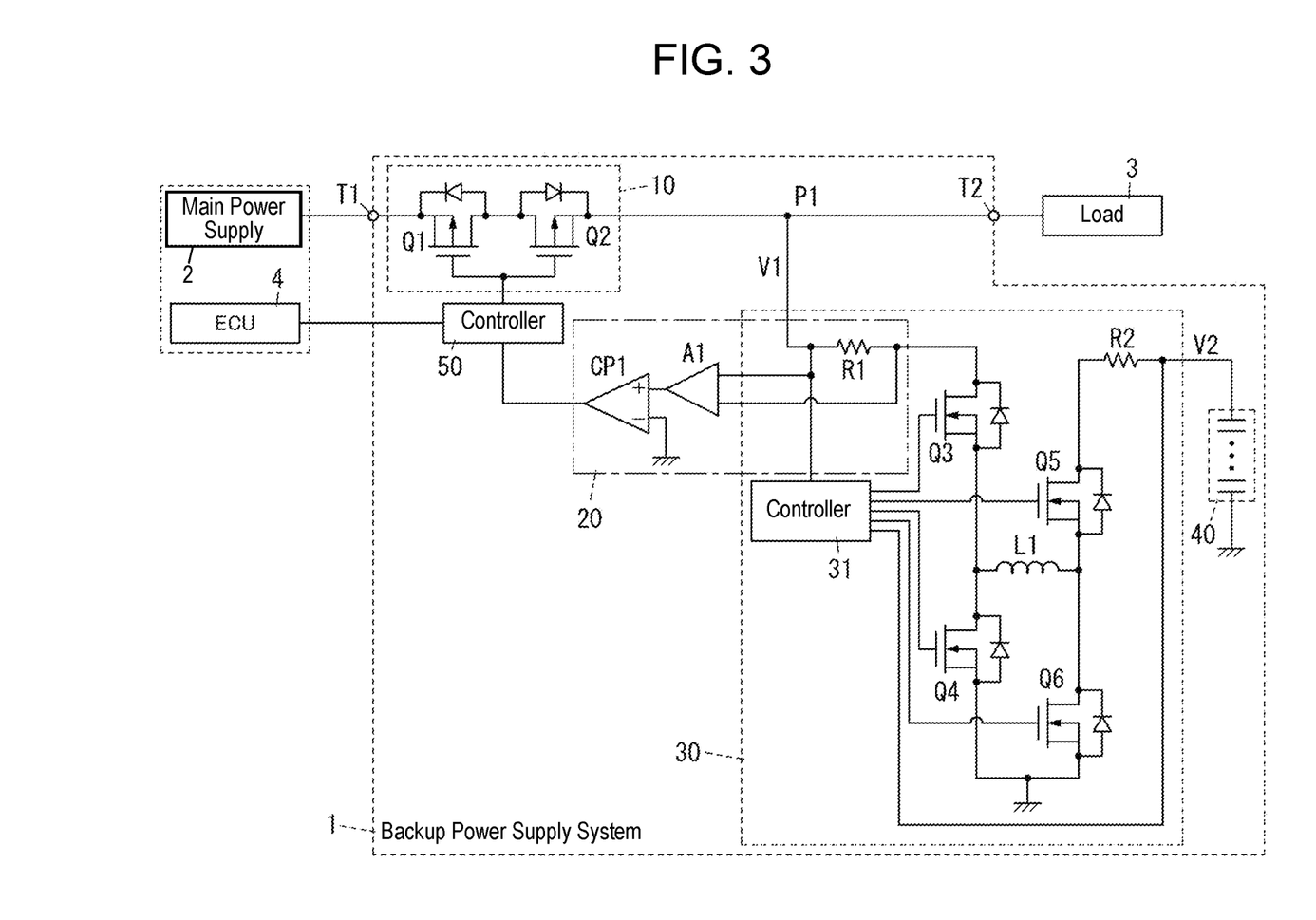
FIG. 3 is a schematic circuit diagram of the backup power supply system according to the embodiment of the present disclosure.

FIG. 3 is a circuit diagram of backup power supply system 1 (see FIG. 1). As described above, backup power supply system 1 includes first terminal T1, second terminal T2, disconnect device 10, current detector 20, charge/discharge device 30, auxiliary power supply 40, and controller 50.

First terminal T1 is configured to be connected to main power supply 2, such as a battery of vehicle 100.

Second terminal T2 is configured to be connected to load 3. Load 3 is, for example, an electric brake system mounted on vehicle 100. Load 3 is not limited to the electric brake system, and may include a control system or a drive system related to advanced driver-assistance systems (ADAS). Load 3 is not limited to one system, and may include plural systems.

Disconnect device 10 is configured to be switched, in response to a control signal input from controller 50, between a connecting state in which a current flows in two directions and a disconnecting state in which a current in both the two directions is interrupted.

Disconnect device 10 includes, for example, two field-effect transistors Q1 and Q2 connected in series between first terminal T1 and second terminal T2. The two field-effect transistors Q1 and Q2 are, for example, P-channel metal-oxide-semiconductor field-effect transistors (MOSFETs). The source of field-effect transistor Q1 is connected to first terminal T1. The source of field-effect transistor Q2 is connected to second terminal T2. The drains of field-effect transistors Q1 and Q2 are electrically connected to each other. The gates of field-effect transistors Q1 and Q2 are electrically connected to each other. Field-effect transistors Q1 and Q2 are turned on and off in response to control signals input from controller 50 to the gates. While field-effect transistors Q1 and Q2 are turned on, disconnect device 10 is in a connecting state in which currents flow in two directions. While field-effect transistors Q1 and Q2 are turned off, disconnect device 10 is in a disconnecting state in which the currents in both two directions are interrupted.

Auxiliary power supply 40 includes, for example, an electrical double layer capacitor (EDLC) rapidly chargeable and dischargeable. That is, auxiliary power supply 40 includes the electrical double layer capacitor. Auxiliary power supply 40 may include two or more power storage devices (for example, electrical double layer capacitors) electrically connected in parallel to one another, in series to one another, or in parallel and series to one another. That is, auxiliary power supply 40 may be implemented by a parallel circuit or a series circuit of two or more power storage devices, or a combination thereof.

Charge/discharge device 30 includes, for example, a bidirectional DC-DC converter. The bidirectional DC-DC converter includes resistors R1 and R2, switching elements Q3-Q6, coil L1, and controller 31. Resistor R1, switching element Q3, and switching element Q4 are connected in series between node P1 and a reference potential. Resistor R2, switching element Q5, and switching element Q6 are connected in series between a positive terminal of auxiliary power supply 40 and the reference potential. Coil L1 is connected between a node connected to switching elements Q3 and Q4 and a node connected to switching elements Q5 and Q6. Switching elements Q3 to Q6 are, for example, N-channel MOSFETs, configured to be controlled by controller 31 to be turned on and off.

Controller 31 is implemented by, for example, a microcomputer including a processor and a memory. That is, controller 31 is implemented by a computer system including a processor and a memory. When the processor executes an appropriate program, the computer system functions as controller 31. The program may be previously recorded in the memory, or may be provided through an electric communication line, such as the Internet, or by being recorded in a non-transitory recording medium, such as a memory card. Controller 31 may not necessarily be implemented by the computer system, and may be implemented by an analog circuit, a gate drive circuit, or the like.

Controller 31 controls turning on and off of switching elements Q3-Q6 based on a difference between a predetermined voltage and first voltage V1 at a first end of resistor R1 opposite to switching element Q3. That is, controller 31 compares first voltage V1 of main power supply 2 with the predetermined voltage to control turning on and off of switching elements Q3-Q6 such that a charging operation is performed when first voltage V1 is equal to or higher than the predetermined voltage, and a discharging operation is performed when first voltage V1 is lower than the predetermined voltage. Accordingly, when first voltage V1 is equal to or higher than the predetermined voltage, charge/discharge device 30 operates to cause a charging current to flow to auxiliary power supply 40. When first voltage V1 is lower than the predetermined voltage, charge/discharge device 30 operates to cause a discharging current to flow from auxiliary power supply 40. Controller 31 has a function of detecting current values of currents flowing through resistors R1 and R2 based on voltages across resistors R1 and R2, respectively. Controller 31 detects current values of the charging current and the discharging current based on the current values of the currents flowing through resistors R1 and R2, and controls the charging current and the discharging current, or performs an operation of protecting auxiliary power supply 40 from overcharge and over-discharge.

Current detector 20 detects at least the discharging current flowing from charge/discharge device 30. In accordance with the present embodiment, current detector 20 includes resistor R1 included in charge/discharge device 30, and detects whether the discharging current flows by detecting a direction of the current flowing through resistor R1.

Specifically, current detector 20 includes amplifier A1 configured to amplify the voltage across resistor R1 at a predetermined gain, and comparator CP1 configured to compare an output voltage of amplifier A1 with the reference potential. Comparator CP1 compares the output voltage of amplifier A1 with the reference potential. The polarity of the output voltage of comparator CP1 depends on the direction of the current flowing through resistor R1. For example, when a charging current flows through resistor R1, the output voltage of comparator CP1 is a positive voltage.

When a discharging current flows through resistor R1, the output voltage of comparator CP1 is a negative voltage. The circuit configuration of current detector 20 is an example, and a configuration of current detector 20 may be appropriately changed. Current detector 20 does not necessarily detect the direction of the current flowing through resistor R1, but may necessarily detect whether the discharging current flows or not.

Current detector 20 detects the current (charging current or discharging current) flowing through resistor R1 based on the voltage across resistor R1 included in charge/discharge device 30. The current detector does not separately require a shunt resistor for detecting a current, accordingly reducing the number of components. That is, in accordance with the present embodiment, resistor R1 included in charge/discharge device 30 serves as a shunt resistor connected to an electric path through which a discharging current flows from auxiliary power supply 40. Current detector 20 thus includes resistor R1 serving as the shunt resistor. Resistor R1, which is a shunt resistor, is connected between node P1 and auxiliary power supply 40. Accordingly, in both the case where the charging current flows through resistor R1 and the case where the discharging current flows therethrough, the polarity of the voltage across resistor R1 changes. Therefore, current detector 20 can detect, based on the polarity of voltage across resistor R1, which one of the charging current or the discharging current flows. In accordance with the present embodiment, current detector 20 and charge/discharge device 30 share resistor R1 which is a shunt resistor, thus providing an advantageous effect reducing the number of components constituting the backup power supply system 1.

Controller 50 is configured to control disconnect device 10 to have disconnect device 10 be in the connecting state or the disconnecting state according to the detection result of current detector 20. Controller 50 is implemented by, for example, a microcomputer including a processor and a memory. That is, controller 50 is implemented by a computer system including a processor and a memory. When the processor executes an appropriate program, the computer system functions as controller 50. The program may be previously recorded in the memory, or may be provided through an electric communication line such as the Internet or by being recorded in a non-transitory recording medium such as a memory card. Controller 50 is not necessarily implemented by a computer system, and may be implemented by an analog circuit, a gate drive circuit, or the like.

While current detector 20 does not detect the discharging current, controller 50 controls disconnect device 10 to have disconnect device 10 be in a connecting state. While disconnect device 10 is in the connecting state, first terminal T1 and second terminal T2 are electrically connected via disconnect device 10. At this moment, when main power supply 2 is in a non-defective state in which main power supply 2 is not defective, charge/discharge device 30 receives power supplied from main power supply 2 and causes a charging current to flow to auxiliary power supply 40 to charge auxiliary power supply 40.

On the other hand, in a case where disconnect device 10 is in the connecting state, when main power supply 2 is in the defective state, charge/discharge device 30 receives power supplied from auxiliary power supply 40 to cause the discharging current to flow, and the discharging current is detected by current detector 20. When the discharging current is detected by current detector 20, controller 50 controls disconnect device 10 to have disconnect device 10 be in the disconnecting state. This configuration prevents the discharging current from auxiliary power supply 40 from flowing to the circuit on main power supply 2 side via disconnect device 10, and prevents the decrease in the power supplied from auxiliary power supply 40 to load 3 in the defective state.

When controller 50 controls disconnect device 10 to have disconnect device 10 be in the disconnecting state, controller 50 continuously controls disconnect device 10 to have disconnect device 10 be in the disconnecting state until a release signal is input from electronic control unit (ECU) 4 of vehicle 100, which is an external system. In other words, controller 50 is configured to control disconnect device 10 to have disconnect device 10 be in the disconnecting state during a period from a time point when current detector 20 detects the discharging current to a time point when the release signal is input from the external system (ECU 4). The release signal is a signal indicating that the defective state of main power supply 2 is released. ECU 4 of vehicle 100 has, for example, a function of monitoring a state of main power supply 2, and outputs the release signal to controller 50 when the defective state is released after main power supply 2 starts being in the defective state. Controller 50 controls disconnect device 10 to have disconnect device 10 be in the disconnecting state until the release signal is input. This configuration reduces the possibility that disconnect device 10 becomes in the connecting state even if the discharging current becomes zero due to the operating state of load 3 or even if the discharging current does not flow because of the charging current flowing from load 3 to auxiliary power supply 40 due to regenerative power generated by load 3. The external system configured to output the release signal to controller 50 is not necessarily ECU 4 of vehicle 100, and may be a monitoring circuit or the like configured to monitor the state of main power supply 2.

(2.2) Operation

Figure 4:
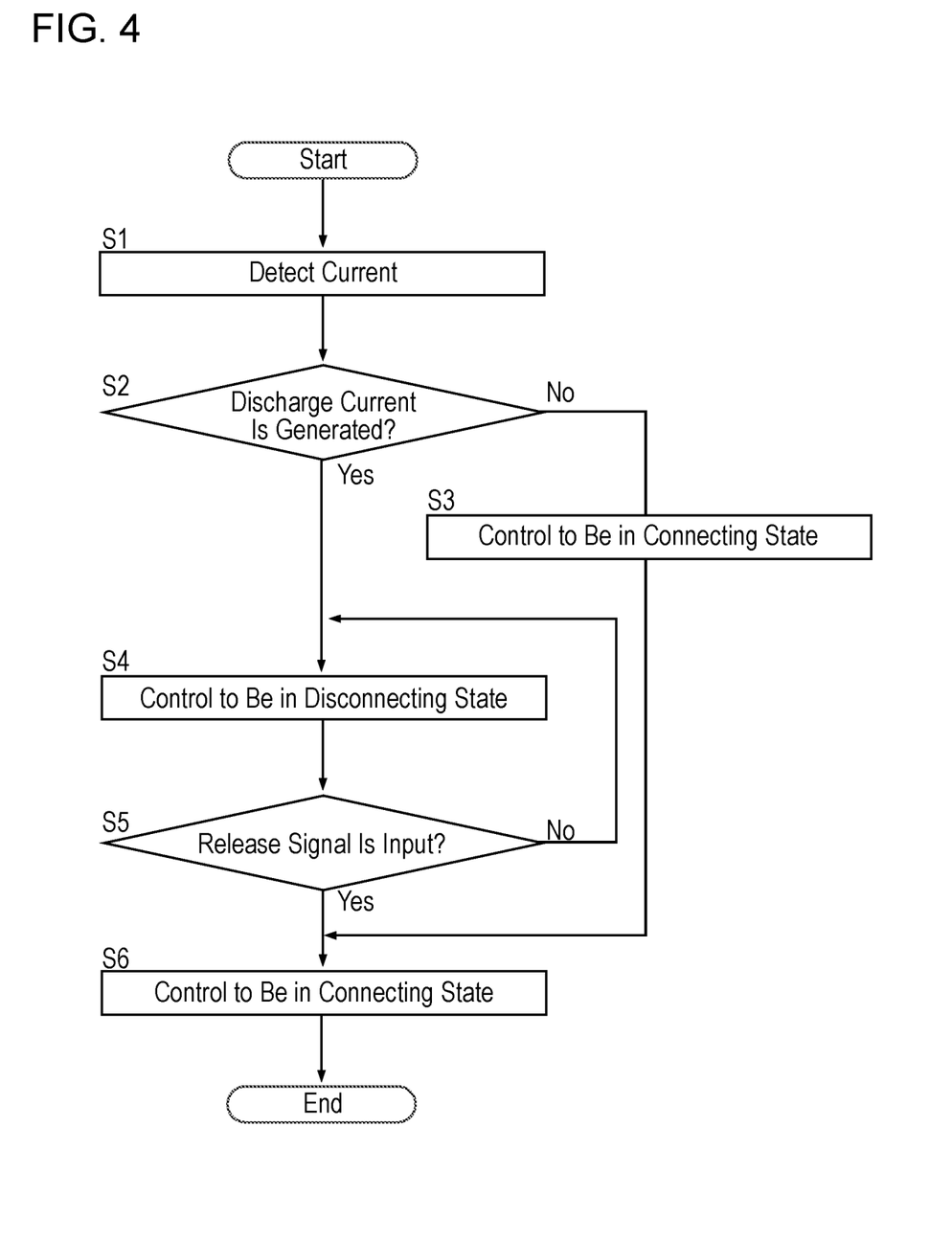
FIG. 4 is a flowchart showing operations of the backup power supply system according to the embodiment of the present disclosure.

An operations of backup power supply system 1 according to the embodiment will be described below along the flowchart shown in FIG. 4. The flowchart shown in FIG. 4 is merely an example of a method for controlling backup power supply system 1 according to the present embodiment, and an order of the processing may be appropriately changed, or the processing may be appropriately added or omitted.

Current detector 20 detects whether or not a discharging current flows through resistor R1 (step S1). Specifically, amplifier A1 of current detector 20 amplifies a voltage across resistor R1. Comparator CP1 compares an output voltage of amplifier A1 with a reference potential, and outputs a voltage having a polarity corresponding to a direction of the current flowing through resistor R1.

Controller 50 determines, based on the polarity (positive or negative) of the output voltage of comparator CP1 (step S2), whether or not the discharging current is generated.

When the discharging current is not generated (step S2: No), controller 50 controls disconnect device 10 to have disconnect device 10 be in the connecting state (step S3). In a case where main power supply 2 is not defective while disconnect device 10 is controlled to have disconnect device 10 be in the connecting state, power is supplied from main power supply 2 to load 3. Charge/discharge device 30 receives power supplied from main power supply 2 and causes a charging current to flow to auxiliary power supply 40 to charge auxiliary power supply 40.

On the other hand, when main power supply 2 is defective while disconnect device 10 is controlled to have disconnect device 10 be in the connecting state, charge/discharge device 30 receives power supplied from auxiliary power supply 40 and causes a discharging current to flow, and power is supplied from auxiliary power supply 40 to load 3. In this case, controller 50 determines in the determination of step S2 that the discharging current is generated (step S2: Yes), and controls disconnect device 10 to have disconnect device 10 be in the disconnecting state (step S4), so that node P1 is electrically disconnected from first terminal T1. This configuration prevents the discharging current from auxiliary power supply 40 from flowing to the circuit on the main power supply 2 side, and prevents a decrease in the power supplied from auxiliary power supply 40 to load 3 in the defective state.

When disconnect device 10 is switched from the connecting state to the disconnecting state, controller 50 controls disconnect device 10 to have disconnect device 10 be in the disconnecting state until a release signal is input from an external system (for example, ECU 4 of vehicle 100).

That is, upon having the release signal not being input from the external system to controller 50 (step S5: No), controller 50 maintains disconnect device 10 to be in the disconnecting state (step S4). At this moment, since first terminal T1 is continuously disconnected electrically from node P1, the discharging current from auxiliary power supply 40 does not flow to the circuit on the main power supply 2 side, and is supplied to load 3.

On the other hand, upon having the release signal being input from the external system to controller 50 (step S5: Yes), controller 50 controls disconnect device 10 to have disconnect device 10 be in the connecting state (step S6). At this moment, the first terminal T1 is electrically connected to the node P1 via disconnect device 10, and therefore, charge/discharge device 30 receives the power supplied from main power supply 2 and causes the charging current to flow to auxiliary power supply 40 to charge auxiliary power supply 40.

(3) Modification

The above-described embodiment is merely one of various embodiments of the present disclosure. The above-described embodiment may be modified in various ways according to the design or the like as long as the object of the present disclosure can be achieved. The same functions as those of backup power supply system 1 may be implemented by the method for controlling backup power supply system 1, a computer program, a non-transitory recording medium in which the program is recorded, or the like. The method for controlling backup power supply system 1 according to an aspect includes a detection step and a control step. In the detection step, the discharging current flowing out of charge/discharge device 30 is detected. In the control step, in a state in which the discharging current is not detected in the detection step, disconnect device 10 is controlled to be in the connecting state, and when the discharging current is detected in the detection step, disconnect device 10 is controlled to be in the disconnecting state. A (computer) program according to an aspect is a program for causing a computer system to execute the method for controlling backup power supply system 1.

Modifications of the above-described embodiment will be described below. The modifications described below may be appropriately combined and applied.

Backup power supply system 1 according to the present disclosure includes a computer system for implementing, for example, controller 50 and controller 31. The computer system mainly includes a processor and a memory as hardware. The functions of controller 50, controller 31, and the like are implemented by the processor executing the program recorded in the memory of the computer system. The program may be recorded in advance in the memory of the computer system, may be provided through an electric communication line, or may be provided by being recorded in a non-transitory recording medium such as a memory card, an optical disc, or a hard disc drive readable by the computer system. The processor of the computer system includes one or more electronic circuits including a semiconductor integrated circuit (IC) or a large-scale integrated circuit (LSI). The integrated circuits such as an IC or an LSI herein are called differently depending on the degree of integration, and include an integrated circuit called a system LSI, a very large-scale integration (VLSI), or an ultra large scale integration (ULSI). A logic device which is programmed after the production of the LSI and which allows reconfiguration of connection relationships within an LSI or reconfiguration of circuit partition within the LSI can also be adopted as a processor. The plurality of electronic circuits may be integrated into one chip, or may be distributed to a plurality of chips. The plurality of chips may be integrated into one device or may be distributed to a plurality of devices. The computer system herein includes a microcontroller including one or more processors and one or more memories. Therefore, the microcontroller is also configured with one or more electronic circuits including a semiconductor integrated circuit or a large-scale integrated circuit.

Each of controller 50 and controller 31 is not limited to being implemented by a computer system, and may be implemented by an analog circuit.

It is not essential for backup power supply system 1 that the plurality of functions in backup power supply system 1 are integrated in one housing, and the components of backup power supply system 1 may be distributed to a plurality of housings. At least some functions of backup power supply system 1, for example, some functions of the controller 50 may be implemented by a cloud (cloud computing) or the like. In a case where backup power supply system 1 is mounted on vehicle 100, some functions of controller 50 may be implemented by the ECU of vehicle 100.

In the above-described embodiment, in the comparison of the two values such as the voltage values, "equal to or higher than" may be "higher than". That is, in the comparison of the two values, whether the two values are equal to each other can be freely changed depending on the setting order of the reference value or the like, and there is no technical difference between "equal to or higher than" and "higher than". Similarly, "lower than" may be "equal to or lower than", and there is no technical difference between "lower than" and "equal to or lower than".

(3.1) Modification 1

Figure 5:
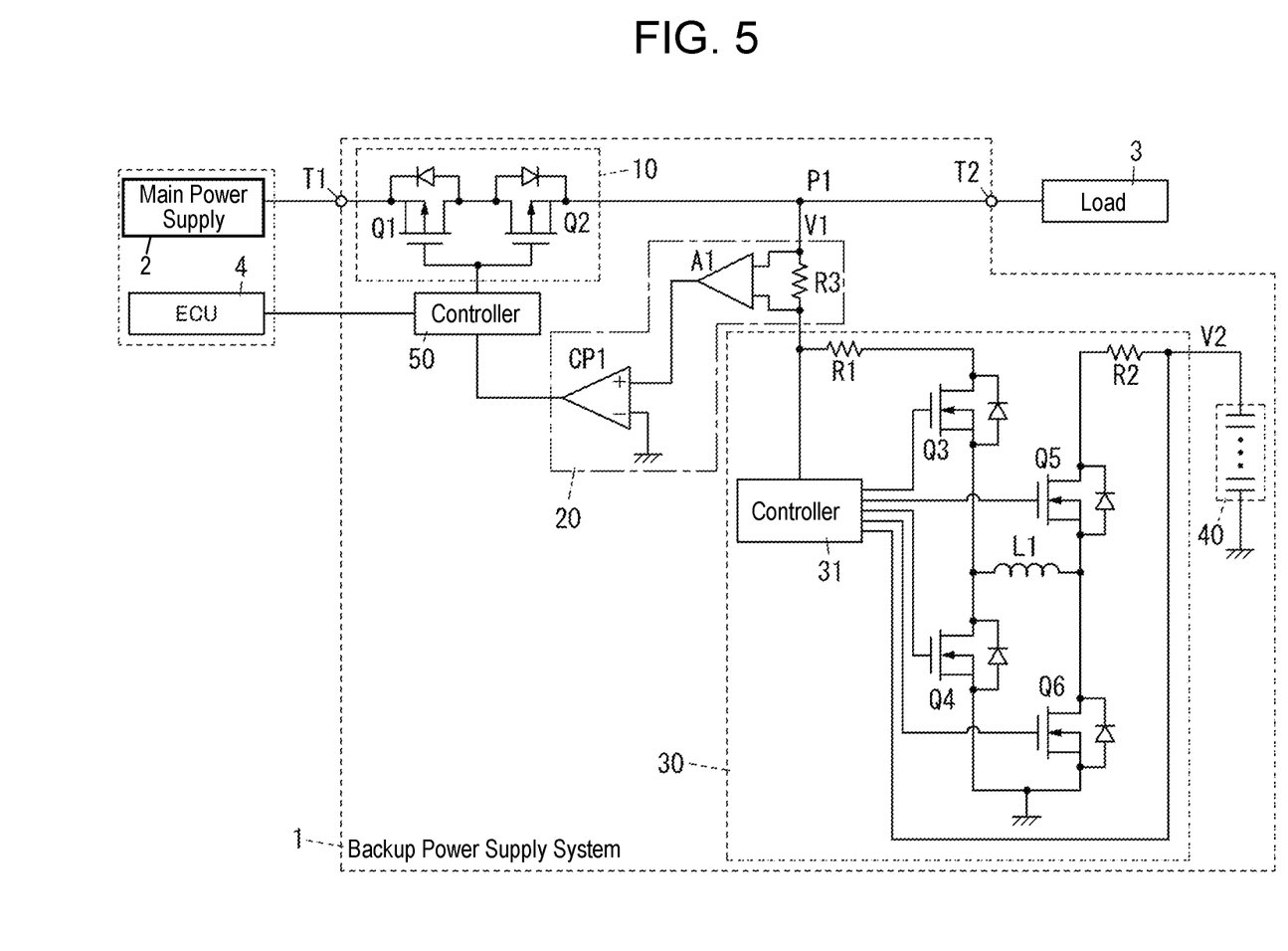
FIG. 5 is a schematic circuit diagram of a backup power supply system according to Modification 1.

Backup power supply system 1 according to Modification 1 will be described below with reference to FIG. 5. Backup power supply system 1 according to Modification 1 is different from the system the above-described embodiment in that shunt resistor R3 included in current detector 20 is provided outside charge/discharge device 30. The configuration of backup power supply system 1 other than current detector 20 is the same as that of the above-described embodiment, and therefore, common components are denoted by the same reference numerals and description thereof is omitted.

In backup power supply system 1 according to Modification 1, current detector 20 includes shunt resistor R3, amplifier A1, and comparator CP1.

Shunt resistor R3 is connected between node P1 and resistor R1 of charge/discharge device 30. Shunt resistor R3 is a resistor to detect a current, and has a resistance value of about several tens of m2 to several hundreds of m2.

Amplifier A1 amplifies a voltage across shunt resistor R3 at a predetermined gain.

Comparator CP1 compares the output voltage of amplifier A1 with the reference potential, and outputs a voltage having a polarity corresponding to a direction of a current flowing through shunt resistor R3. That is, comparator CP1 outputs a voltage having the polarity depending on whether a discharging current flows through shunt resistor R3 or not.

Controller 50 determines, depending on the polarity of the output voltage of comparator CP1, whether the discharging current flows or not. While the discharging current flows, controller 50 controls disconnect device 10 to have disconnect device 10 be in the disconnecting state.

Shunt resistor R3 is connected between node P1 and charge/discharge device 30. The position of shunt resistor R3 is not necessarily between node P1 and charge/discharge device 30. Shunt resistor R3 may be disposed at a position where the direction of the current flowing through shunt resistor R3 is determined in both the case where the charging current flows and the case where the discharging current flows in an electric path through which the discharging current flows. That is, shunt resistor R3 may be disposed between node P1 and first terminal T1.

(3.2) Modification 2

Figure 6:
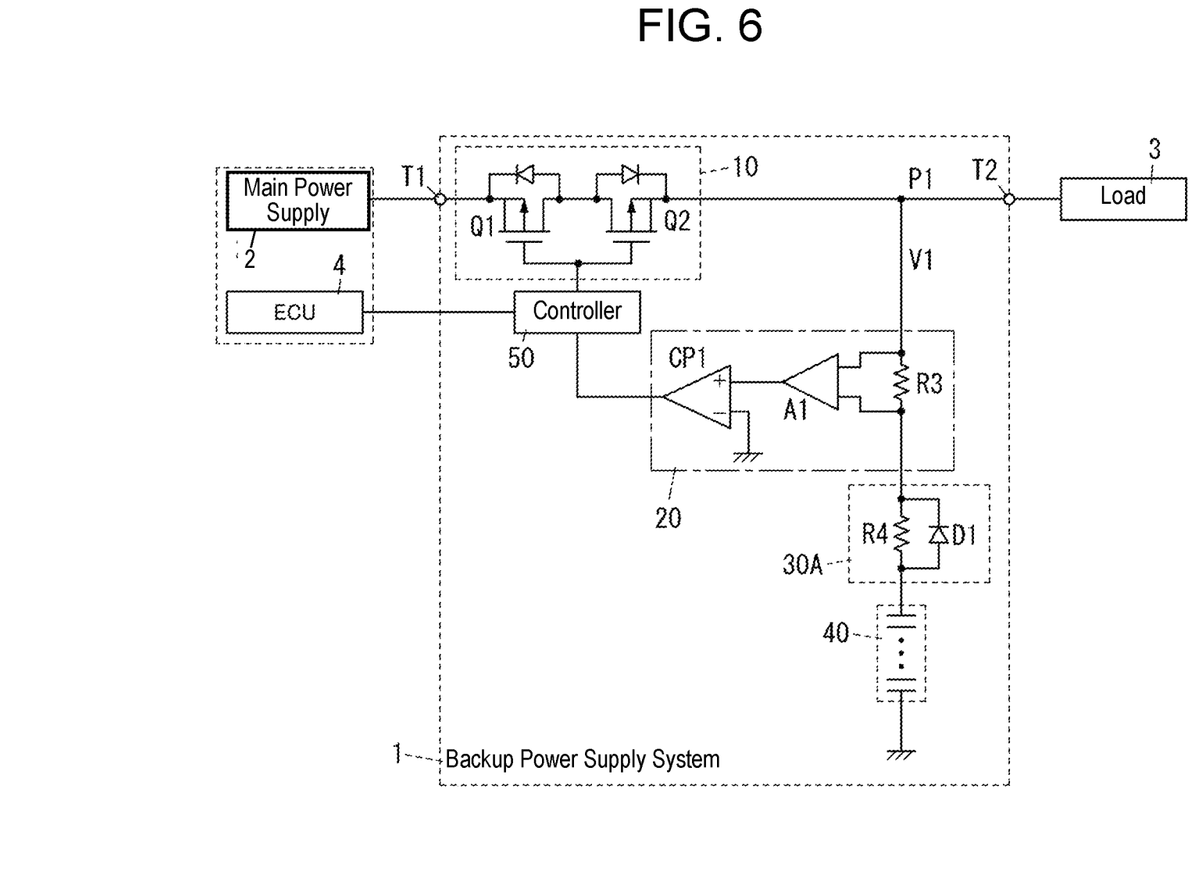
FIG. 6 is a schematic circuit diagram of a backup power supply system according to Modification 2.

Backup power supply system 1 according to Modification 2 will be described with reference to FIG. 6. Backup power supply system 1 according to Modification 2 is different from Modification 1 in the circuit configuration of charge/discharge device 30A. The configuration of backup power supply system 1 other than charge/discharge device 30A is the same as that of above-described Modification 1, and therefore, common components are denoted by the same reference numerals and description thereof is omitted.

In backup power supply system 1 according to Modification 2, charge/discharge device 30A includes a parallel circuit including resistor R4 and diode D1.

Resistor R4 is a resistor for limiting the charging current flowing to auxiliary power supply 40, and is connected between node P1 and auxiliary power supply 40.

Diode D1 has an anode connected to auxiliary power supply 40 side and a cathode connected to node P1 side, and is connected in parallel with resistor R4.

In a case where the voltage of main power supply 2 is higher than the charging voltage of auxiliary power supply 40 in the non-defective state of main power supply 2, a charging current flows from main power supply 2 to auxiliary power supply 40 via shunt resistor R3 and resistor R4, and charges auxiliary power supply 40. At this moment, controller 50 determines that the discharging current does not flow through shunt resistor R3, and controls disconnect device 10 to have disconnect device 10 be in the connecting state. When disconnect device 10 is in the connecting state, power is supplied from main power supply 2 to load 3 via disconnect device 10, and load 3 operates. The charging current flows from main power supply 2 to auxiliary power supply 40 via disconnect device 10, shunt resistor R3, and resistor R4, and charges auxiliary power supply 40.

When the voltage of main power supply 2 is lower than the charging voltage of auxiliary power supply 40 in the defective state of main power supply 2, a discharging current flows from auxiliary power supply 40 via diode D1 and shunt resistor R3. At this moment, controller 50 determines that the discharging current flows through shunt resistor R3, and controls disconnect device 10 to have disconnect device 10 be in the disconnecting state, and therefore, the discharging current is supplied from auxiliary power supply 40 to load 3 to operate load 3.

The circuit configuration of charge/discharge device 30A is not necessarily the configuration of Modification 1 and may be appropriately changed.

(3.3) Other Modifications

In the above-described embodiment, auxiliary power supply 40 is not necessarily the electrical double layer capacitor, and may be a lithium ion capacitor (LIC) or a secondary battery, such as a lithium ion battery (LIB). In the lithium ion capacitor, a positive electrode is made of the same material (for example, active carbon) as that of the EDLC, and a negative electrode is made of the same material (for example, a carbon material such as graphite) as that of the LIB.

Auxiliary power supply 40 is not necessarily an electrical double layer capacitor, and may be, for example, an electrochemical device having a configuration described below. The electrochemical device herein includes a positive electrode, a negative electrode, and a non-aqueous electrolyte. The positive electrode includes a positive electrode current collector and a positive electrode material layer held on the positive electrode current collector and containing a positive-electrode active material. The positive-electrode material layer contains a conductive polymer as a positive electrode active material which is doped or dedoped with anions (dopants). The negative electrode includes a negative electrode material layer containing a negative-electrode active material. The negative-electrode active material is, for example, a material in which an oxidation-reduction reaction accompanied by intercalation and desorption of lithium ions proceeds, and specific examples thereof include a carbon material, a metal compound, an alloy, and a ceramic material. The non-aqueous electrolyte has, e.g., conductivity to lithium ion conductivity. Such non-aqueous electrolyte contains lithium salt and non-aqueous solution having the lithium salt dissolved therein. The electrochemical device having such a configuration has an energy density higher than that of an electrochemical double layer capacitor or the like.

Current detector 20 includes a shunt resistor connected to an electric path through which the discharging current flows, and detects, based on the polarity of the voltage across the shunt resistor, whether the discharging current flows or not. Current detector 20 is not necessarily a current detector including a shunt resistor. Current detector 20 may be a non-contact current sensor. Current detector 20 may include, for example, a coil disposed close to an electric path through which a discharging current flows, and detect, based on a direction of an induced current generated in the coil when a current flows through the electric path, whether or not a charging current or a discharging current flows through the electric path.

SUMMARY

As described above, a backup power supply system (1) according to a first aspect includes a first terminal (T1), a second terminal (T2), a disconnect device (10), an auxiliary power supply (40), a charge/discharge device (30), a current detector (20), and a controller (50). The first terminal (T1) is configured to be connected to a main power supply (2). The second terminal (T2) is configured to be connected to a load (3). The disconnect device (10) is connected between the first terminal (T1) and the second terminal (T2), and is switchable between a connecting state and a disconnecting state. The auxiliary power supply (40) is configured to supply power to the load (3) in a defective state in which the main power supply (2) is defective. The charge/discharge device (30) is connected between the auxiliary power supply (40) and a node (P1) between the disconnect device (10) and the second terminal (T2). The charge/discharge device (30) is configured to: receive power supplied from the main power supply (2) to cause a charging current to flow to the auxiliary power supply (40) in a non-defective state in which the main power supply (2) is not defective; and receive power supplied from the auxiliary power supply (40) to cause a discharging current to flow to the load (3) in the defective state. The current detector (20) is configured to detect at least the discharging current flowing from the charge/discharge device (30). The controller (50) is configured to: control the disconnect device (10) to have the disconnect device (10) be in the connecting state while the current detector (20) does not detect the discharging current; and control the disconnect device (10) to have the disconnect device (10) be in the disconnecting state while the current detector (20) detects the discharging current.

According to this aspect, in the defective state of the main power supply (2), the charge/discharge device (30) receives power from the auxiliary power supply (40) and causes a discharging current to flow to the load (3) to operate the load (3). While the charge/discharge device (30) receives power supplied from the auxiliary power supply (40) and causes a discharging current to flow, the discharging current is detected by the current detector (20), and the controller (50) switches the disconnect device (10) to the disconnecting state. Therefore, the discharging current from the auxiliary power supply (40) may be prevented from flowing to a circuit on main power supply (2) side. This configuration provides an advantageous effect to prevent a decrease in the power supplied to the load (3).

In the backup power supply system (1) according to a second aspect, which may be implemented in conjunction with the first aspect, the charge/discharge device (30) includes a bidirectional DC-DC converter.

According to this aspect, the bidirectional DC-DC converter converts a voltage input from auxiliary power supply (40) into a voltage having a voltage value necessary for the load (3) and supply the voltage to the load (3).

In the backup power supply system (1) according to a third aspect, which may be implemented in conjunction with the first or second aspect, the current detector (20) includes a shunt resistor (R1, R3) connected to an electric path through which a discharging current flows from the auxiliary power supply (40).

According to this aspect, the current detector (20) detects the discharging current flowing through the electric path by detecting the voltage across the shunt resistor (R1, R3).

In the backup power supply system (1) according to a fourth aspect, which may be implemented in conjunction with the third aspect, the shunt resistor (R1, R3) is connected between the node (P1) and the auxiliary power supply (40).

According to this aspect, the discharging current flowing from the auxiliary power supply (40) in the defective state of main power supply (2) is reliably detected.

In the backup power supply system (1) according to a fifth aspect, which may be implemented in conjunction with the third or fourth aspect, the current detector (20) and the charge/discharge device (30) share the shunt resistor (R1).

According to this aspect, the number of components constituting the backup power supply system (1) is reduced.

In the backup power supply system (1) according to a sixth aspect, which may be implemented in conjunction with any one of the first to fifth aspects, the controller (50) is configured to control the disconnect device (10) to have the disconnect device (10) be in the disconnecting state during a period from a time point when the current detector (20) detects the discharging current to a time point when a release signal is input from an external system (4).

According to this aspect, in a case where power is supplied from the auxiliary power supply (40) to the load (3) in the defective state of the main power supply (2), the possibility that disconnect device (10) is in the connecting state is reduced even if the discharging current does not flow due to an operating state of load (3) or the like.

In the backup power supply system (1) according to a seventh aspect, which may be implemented in conjunction with any one of the first to sixth aspects, the auxiliary power supply (40) includes an electrical double layer capacitor.

According to this aspect, auxiliary power supply (40) is rapidly charged and discharged.

A movable apparatus (100) according to an eighth aspect includes the backup power supply system (1) according to any one of the first to seventh aspects, and a movable body (101). The backup power supply system (1), the main power supply (2), and the load (3) are mounted on the movable body (101).

According to this aspect, an advantageous effect preventing a decrease in power supplied to load (3) is provided.

A method for controlling the backup power supply system (1) according to a ninth aspect is a method for controlling the backup power supply system (1) according to any one of the first to seventh aspects, and includes a detection step and a control step. In the detection step, the discharging current flowing from the charge/discharge device (30) is detected. In the control step, while the discharging current is not detected in the detection step, the disconnect device (10) is in the connecting state. While the discharging current is detected in the detection step, the disconnect device (10) is in the disconnecting state.

According to this aspect, an advantageous effect preventing a decrease in power supplied to load (3) is provided.

A program according to a tenth aspect is a program for allowing a computer system to execute the method for controlling the backup power supply system (1) according to the ninth aspect.

According to this aspect, an advantageous effect preventing a decrease in power supplied to load (3) is provided.

Not being limited to the above-described aspects, the various configurations (including modifications) of the backup power supply system (1) according to the above-described embodiment may be implemented by the method for controlling the backup power supply system (1), a (computer) program, or a non-transitory recording medium in which the program is recorded.

The configurations according to the second to seventh aspects are not essential for the backup power supply system (1), and may be omitted appropriately.

REFERENCE MARKS IN THE DRAWINGS 1 backup power supply system
2 main power supply 3 load
4 external system
10 disconnect device
20 current detector
30 charge/discharge device
40 auxiliary power supply
50 controller
100 vehicle (movable apparatus)
101 movable body
P1 node
R1 resistor (shunt resistor)
R3 shunt resistor
T1 first terminal
T2 second terminal

The invention claimed is:

1. A backup power supply system, comprising:
a first terminal configured to be connected to a main power supply;
a second terminal configured to be connected to a load;
a disconnect device connected between the first terminal and the second terminal, the disconnect device being switchable between a connecting state and a disconnecting state;
an auxiliary power supply configured to supply power to the load in a defective state in which the main power supply is defective;
a charge/discharge device connected between the auxiliary power supply and a node between the disconnect device and the second terminal, the charge/discharge device being configured to
receive power supplied from the main power supply to cause a charging current to flow to the auxiliary power supply in a non-defective state in which the main power supply is not defective, and
receive power supplied from the auxiliary power supply to cause a discharging current to flow from the auxiliary power supply to the load in the defective state;
a current detector configured to detect at least the discharging current flowing from the charge/discharge device; and
a controller configured to
control the disconnect device to be in the connecting state while the current detector does not detect the discharging current, and
control the disconnect device to be in the disconnecting state while the current detector detects the discharging current,
wherein the current detector detects whether any discharging current flows or not, and the controller controls the disconnect device to be in the disconnecting state while the current detector detects that any discharging current flows.

2. The backup power supply system according to claim 1, wherein the charge/discharge device includes a bidirectional DC-DC converter.

3. The backup power supply system according to claim 1, wherein the current detector includes a shunt resistor connected to an electric path through which the discharging current flows from the auxiliary power supply.

4. The backup power supply system according to claim 3, wherein the shunt resistor is connected between the node and the auxiliary power supply.

5. The backup power supply system according to claim 3, wherein the current detector and the charge/discharge device share the shunt resistor.

6. The backup power supply system according to claim 1, wherein the controller is configured to control the disconnect device to be in the disconnecting state during a period from a first time point when the current detector detects the discharging current to a second time point when a release signal is input from an external system.

7. The backup power supply system according to claim 1, wherein the auxiliary power supply includes an electrical double layer capacitor.

8. A movable apparatus comprising:
the backup power supply system according to claim 1; and
a movable body on which the backup power supply system, the main power supply, and the load are mounted.

9. A method for controlling the backup power supply system according to claim 1, the method comprising:
detecting the discharging current flowing from the charge/discharge device; and
controlling the disconnect device to be in the connecting state while the discharging current is not detected in the detecting, and controlling the disconnect device to be in the disconnecting state while the discharging current is detected in the detecting.

10. A non-transitory computer-readable medium including a program, the program allowing a computer system to execute the method for controlling the backup power supply system according to claim 9.

11. The backup power supply system according to claim 1, wherein the current detector detects which one of the charging current flows to the auxiliary power supply or the discharging current flows from the auxiliary power supply based on a polarity of a voltage measured by the current detector.

12. The backup power supply system according to claim 1, wherein the current detector includes a shunt resistor and detects which one of the charging current flows to the auxiliary power supply or the discharging current flows from the auxiliary power supply based on a polarity of a voltage across the shunt resistor.

13. The backup power supply system according to claim 1, wherein the controller determines which one of the charging current flows to the auxiliary power supply or the discharging current flows from the auxiliary power supply based on a polarity of a voltage output by the current detector.

14. The backup power supply system according to claim 1, wherein the current detector includes a coil and detects which one of the charging current flows to the auxiliary power supply or the discharging current flows from the auxiliary power supply based on a direction of an induced current generated in the coil.

* * * * *